(12) United States Patent
Abe et al.

(10) Patent No.: US 8,851,220 B2
(45) Date of Patent: Oct. 7, 2014

(54) AIR CLEANER DEVICE

(75) Inventors: Ryuichi Abe, Wako (JP); Takaaki Shomura, Wako (JP); Koki Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 658 days.

(21) Appl. No.: 13/052,557

(22) Filed: Mar. 21, 2011

(65) Prior Publication Data

US 2011/0232983 A1 Sep. 29, 2011

(30) Foreign Application Priority Data

Mar. 23, 2010 (JP) ................................ 2010-066378

(51) Int. Cl.
*B60K 13/02* (2006.01)

(52) U.S. Cl.
USPC ........................................ 180/68.1; 180/68.3

(58) Field of Classification Search
USPC ........................................ 180/68.1, 68.3, 219
See application file for complete search history.

(56) References Cited

U.S. PATENT DOCUMENTS

| | | | |
|---|---|---|---|
| 6,231,630 B1 | 5/2001 | Ernst et al. | |
| 6,306,190 B1 * | 10/2001 | Tsuruta et al. ................ | 55/385.3 |
| 7,985,271 B2 | 7/2011 | Nobuhira | |
| 2005/0133289 A1 * | 6/2005 | Nakano et al. ................ | 180/219 |
| 2006/0065456 A1 | 3/2006 | Noda | |
| 2007/0065323 A1 * | 3/2007 | Horiuchi ........................ | 417/572 |
| 2008/0289796 A1 * | 11/2008 | Sasano et al. .................. | 165/51 |
| 2009/0049813 A1 * | 2/2009 | Nobuhira ....................... | 55/467 |
| 2009/0218152 A1 * | 9/2009 | Oohashi et al. ............... | 180/68.3 |
| 2009/0242305 A1 * | 10/2009 | Asano ............................ | 180/219 |
| 2009/0322069 A1 * | 12/2009 | Koike ............................ | 280/835 |

FOREIGN PATENT DOCUMENTS

| | | | | |
|---|---|---|---|---|
| JP | 62048955 A | 3/1987 | | |
| JP | 05018329 A | * 1/1993 | ............. | F02M 35/12 |
| JP | 05018330 A | * 1/1993 | ............. | F02M 35/14 |
| JP | 06-248955 | 9/1994 | | |
| JP | 2003-247468 | 9/2003 | | |
| JP | 2003-247468 A | 9/2003 | | |
| JP | 2009-083810 A | 4/2009 | | |
| JP | 2009-190642 A | 8/2009 | | |
| JP | 2011214449 A | * 10/2011 | ........... | F02M 35/024 |
| JP | 2012117429 | * 6/2012 | ........... | F02M 35/024 |
| WO | 2006/032656 A2 | 3/2006 | | |

* cited by examiner

*Primary Examiner* — J. Allen Shriver, II
*Assistant Examiner* — Bridget Avery
(74) *Attorney, Agent, or Firm* — Squire Patton Boggs (US)LLP (57) ABSTRACT

An air cleaner device can include an air cleaner case including a case main unit and a cover. An intake duct can be disposed on the cover, and an intake path can be disposed on the case main unit. An air cleaner element can be accommodated in the air cleaner case. When the air cleaner device is mounted in a vehicle and viewed from a vehicle side, the air cleaner case is formed to be vertically long. The intake duct is formed to have an upstream-side opening portion thereof oriented toward a first side of the air cleaner case, and a downstream-side opening portion thereof can be oriented downwardly. The intake path is formed to have an upstream-side opening portion thereof oriented upwardly to face the downstream-side opening portion of the intake duct, and a downstream-side opening portion thereof is oriented toward a second side of the air cleaner case.

17 Claims, 7 Drawing Sheets

AIR CLEANER DEVICE

BACKGROUND

1. Field

The present invention relates to an air cleaner device.

2. Description of the Related Art

A known air cleaner device includes an air cleaner element disposed between a dirty room and a clean room, and an intake duct and an intake path disposed to extend vertically in parallel with each other, the intake duct having a downstream-side opening portion facing a rearward direction and the intake path having an upstream-side opening portion facing the same rearward direction as the downstream-side opening portion of the intake duct. Such a configuration is shown, for example, in Japanese Patent Laid-Open No. 2003-247468 (Patent Document 1).

In the air cleaner device disclosed in Patent Document 1, the downstream-side opening portion of the intake duct and the upstream-side opening portion of the intake path face the same direction. This results in an intake air stream being substantially U-shaped, which can restrict the intake air stream as compared with an arrangement in which the downstream-side opening portion of the intake duct faces the upstream-side opening portion of the intake path. In addition, an air cleaner case is formed to have a longitudinal length that is longer than a vertical length in order to secure capacity thereof. This, however, restricts arrangements of parts in the longitudinal direction of the air cleaner device, which could lead to a longitudinally long air cleaner device in a vehicle.

SUMMARY

Embodiments or the present invention have been made in view of the foregoing situations and it is an object of the present invention to provide an air cleaner device that can ensure a good intake air stream and that can be built compactly.

To achieve the foregoing object, a first embodiment of the present invention can include an air cleaner device, including an air cleaner case including a case main unit and a cover and an intake duct disposed on the cover. An intake path is disposed on the case main unit and can be connected to an engine. An air cleaner element is accommodated in the air cleaner case, such that an intake air introduced through the intake duct flows past the air cleaner element before being supplied to the engine by way of the intake path. When the air cleaner device is mounted in a vehicle and viewed from a vehicle side, the air cleaner case is formed to be vertically long. The intake duct is formed to have an upstream-side opening portion thereof oriented toward a first side of the air cleaner case and a downstream-side opening portion thereof oriented downwardly. The intake path is formed to have an upstream-side opening portion thereof oriented upwardly to face the downstream-side opening portion of the intake duct and a downstream-side opening portion thereof oriented toward a second side of the air cleaner case.

In a second embodiment of the present invention, the downstream-side opening portion of the intake duct and the upstream-side opening portion of the intake path can be disposed to face each other. The intake duct and the intake path are disposed such that at least parts thereof overlap each other in projection.

In a third embodiment of the present invention, when the air cleaner device is mounted in a vehicle and viewed from a vehicle side, the upstream-side opening portion of the intake path is obliquely formed relative to a path width of the intake path.

In a fourth embodiment of the present invention, the second side of the air cleaner case can bulge more as compared with the first side thereof to form a bulge. The upstream-side opening portion of the intake path is formed so as to be oriented toward an inner surface of the bulge.

In a fifth embodiment of the present invention, the downstream-side opening portion of the intake duct can be formed to be in parallel with a plane of a flat sheet-like filter portion of the air cleaner element.

In a sixth embodiment of the present invention, a vehicle body frame of a vehicle on which the air cleaner device is mounted can include a head pipe disposed at a front end thereof. The air cleaner case can be disposed so as to extend along a longitudinal direction of the head pipe, and the intake path is faced rearwardly of the vehicle and connected to the engine.

In a seventh embodiment of the present invention, the air cleaner case is disposed forwardly of a storage box, and the air cleaner case is disposed obliquely relative to a front surface of the storage box. Electrical components can be disposed between a rear portion of the air cleaner case and a front portion of the storage box.

In an eighth embodiment of the present invention, the filter portion can be formed such that four corners thereof follow along a peripheral edge portion of the air cleaner element.

In the first embodiment of the present invention, when the air cleaner device is mounted in a vehicle and viewed from a vehicle side, the air cleaner case is formed to be longer in a vertical direction than in a horizontal direction. The intake duct is formed to have the upstream-side opening portion thereof oriented toward a first side of the air cleaner case and the downstream-side opening portion thereof oriented downwardly; and the intake path is formed to have the upstream-side opening portion thereof oriented upwardly to face the downstream-side opening portion of the intake duct and the downstream-side opening portion thereof oriented toward a second side of the air cleaner case. An intake air can therefore be smoothly introduced to form a substantially S-shaped stream to thereby achieve a good intake air stream for the air cleaner device. In addition, as compared with the related art arrangement in which the downstream-side opening portion of the intake duct and the upstream-side opening portion of the intake path are oriented toward the same direction, the air cleaner device according to an embodiment of the present invention can be made smaller in longitudinal and vertical lengths. The air cleaner device can therefore be built compactly.

In another embodiment of the present invention, the downstream-side opening portion of the intake duct and the upstream-side opening portion of the intake path are disposed to face each other. This ensures a good intake air stream. In addition, the intake duct and the intake path are disposed such that at least parts thereof overlap each other in projection. The air cleaner device can have a shorter longitudinal length and can thus be built compactly.

In another embodiment of the present invention, when the air cleaner device is mounted in a vehicle and viewed from a vehicle side, the upstream-side opening portion of the intake path is obliquely formed relative to the path width of the intake path. As compared with an arrangement in which the upstream-side opening portion of the intake path is formed to have the same path width as that of the intake path, a larger amount of intake air can be drawn in more smoothly.

In another embodiment of the present invention, the second side of the air cleaner case bulges more as compared with the first side thereof to form the bulge. The upstream-side opening portion of the intake path is formed so as to be oriented toward the inner surface of the bulge. As compared with an arrangement in which the upstream-side opening portion of the intake path is oriented toward the first side of the air cleaner case, intake efficiency can be enhanced.

In another embodiment of the present invention, the downstream-side opening portion of the intake duct is formed to be in parallel with a plane of the flat sheet-like filter portion of the air cleaner element. The intake air introduced through the intake duct can therefore be made to flow linearly and evenly relative to the filter portion, so that filtration efficiency can be enhanced.

In another embodiment of the present invention, the air cleaner case is disposed so as to extend along the longitudinal direction of the head pipe. A distance between the head pipe and the air cleaner device can therefore be made small. Additionally, the intake path is faced rearwardly of the vehicle and connected to the engine. As compared with an arrangement in which the air cleaner device is disposed to extend longitudinally in a perpendicular direction, the engine can be faced forwardly of the vehicle to be compactly disposed, which makes for a shorter longitudinal length of the vehicle.

In another embodiment of the present invention, the air cleaner case is disposed forwardly of the storage box. The air cleaner case is disposed obliquely relative to the front surface of the storage box. Electrical components can be disposed between the rear portion of the air cleaner case and the front portion of the storage box. The electrical components can therefore be disposed by effectively using a dead space between the air cleaner case and the storage box.

In another embodiment of the present invention, the filter portion is formed such that the four corners thereof follow along the peripheral edge portion of the air cleaner element. As compared with an arrangement in which the filter portion is formed into a simple rectangle, the filter portion can have a greater filtering area for the improved filtration efficiency.

DETAILED DESCRIPTION

Embodiments of an air cleaner device to which the present invention is applied will be described in detail below with reference to the accompanying drawings. The drawings should be viewed in the direction of reference symbols. Throughout the descriptions given hereunder, expressions indicating directions including front and rear, right and left, and upper and lower mean the same directions as those as viewed from a rider. In the drawings, an arrow Fr indicates forward of the vehicle, an arrow Rr indicates rearward of the vehicle, an arrow L indicates leftward of the vehicle, an arrow R indicates rightward of the vehicle, an arrow U indicates upward of the vehicle, and an arrow D indicates downward of the vehicle.

Figure 1:
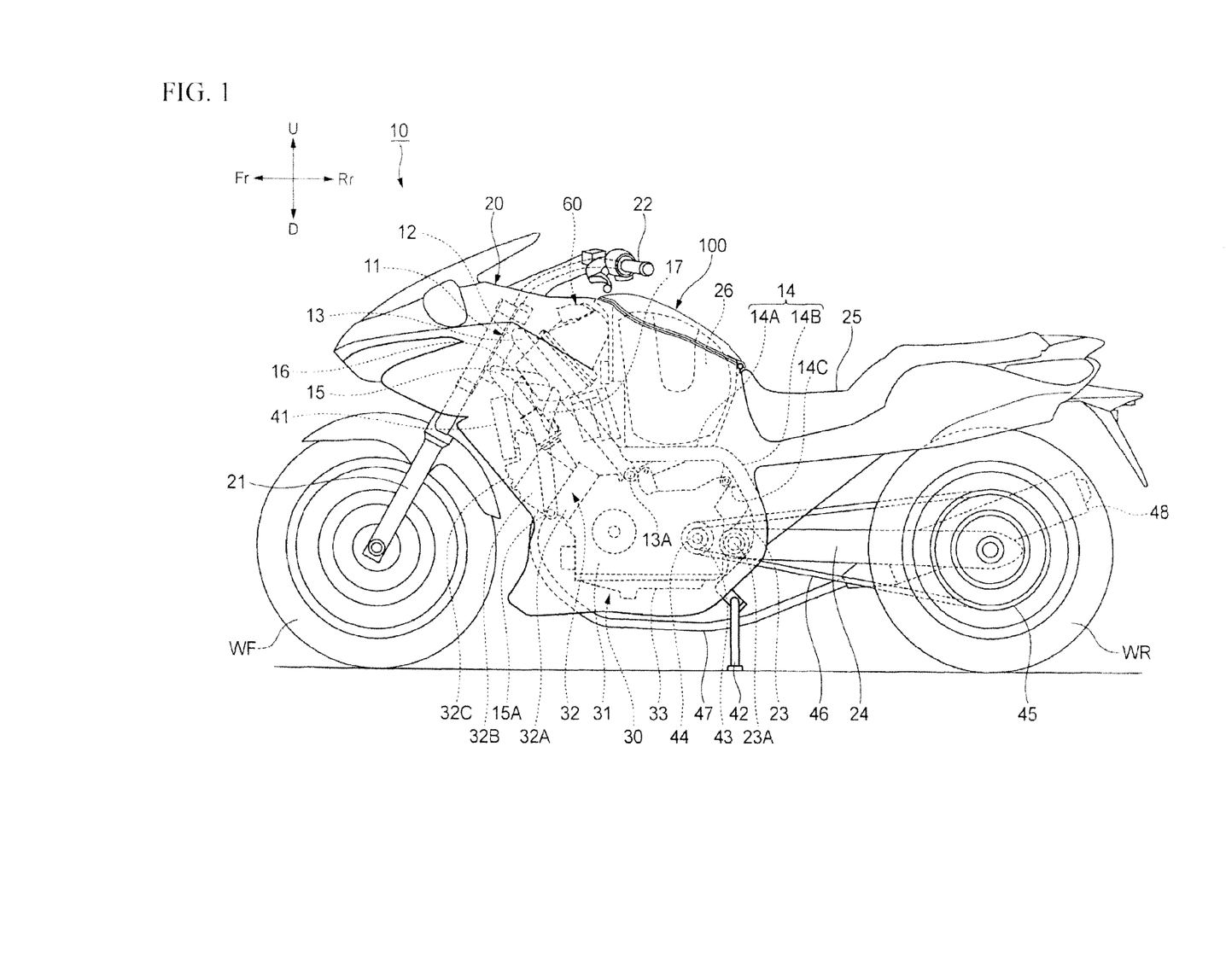
FIG. 1 is a left side elevational view for illustrating a motorcycle in which one embodiment of an air cleaner device according to the present invention is mounted.

Referring to FIG. 1, a vehicle such as motorcycle 10 can include a vehicle body frame 11 which is covered in a vehicle body cover or fairing 20 made, for example, of a synthetic resin.

The vehicle body frame 11 can include a head pipe 12, a pair of left and right main frames 13, a pair of left and right center frames 14, and a pair of left and right down frames 15. Specifically, the head pipe 12 is disposed at a front end of the vehicle body frame 11. The main frames 13 extend obliquely downwardly toward the rear from the left and right of an upper portion of the head pipe 12. The center frames 14 extend horizontally toward the rear from rear ends of the main frames 13 and are then bent in a rearwardly protruding condition to extend downwardly. The down frames 15 extend obliquely downwardly toward the rear from the left and right of a lower portion of the head pipe 12. The vehicle body frame 11 further includes, though not shown, a pair of left and right seat stays and a pair of left and right middle frames extending rearwardly from rear upper portions and rear end portions, respectively, of the center frames 14 and having respective rear ends connected to each other.

The head pipe 12 can support a pair of left and right front forks 21 steerably to the right and left. The front forks 21 extend downwardly to journal a front wheel WF at lower ends thereof. A steering handlebar 22 is connected to upper portions of the front forks 21. A pivot plate 23 is disposed on the center frames 14. The pivot plate 23 rotatably supports a front end of a rear fork 24 via a pivot bolt 23A. The rear fork 24 journals a rear wheel WR at a rear end thereof and is vertically swingably supported via a rear cushion not shown.

An occupant seat 25 is disposed upwardly of the pair of left and right seat stays. The occupant seat 25 integrates a rider's seat with a pillion. Though not shown, a fuel tank can be disposed between rear portions (between the seat stays and the middle frames) of the vehicle body frame 11.

First and second reinforcement frames 16, 17 can be disposed between the main frames 13 and the down frames 15 that are disposed vertically wide apart. The first and the second reinforcement frames 16, 17 connect between the main frame 13 and the down frame 15. Specifically, the first reinforcement frame 16 extends rearwardly from a front end portion of the down frame 15 to connect between the down frame 15 and the main frame 13. The second reinforcement frame 17 extends downwardly from the main frame 13 at a position near a rear end of the first reinforcement frame 16 to thereby connect between the main frame 13 and the down frame 15.

An engine or power unit 30 is supported downwardly of the main frames 13 and horizontal portions 14A of the center frames 14, and forwardly of downward extensions 14B of the center frames 14. In this example, engine 30 can be a water-cooled, parallel two-cylinder engine, including a cylinder portion 32 that is inclined upwardly toward the front from a front upper portion of a crankcase 31. The engine 30 is supported as detailed below. Specifically, the front upper portion of the crankcase 31 is supported by rear end portions 13A of the left and right main frames 13, a rear upper portion of the crankcase 31 is supported by a pair of left and right engine hangers 14C disposed between the horizontal portions 14A and the downward extensions 14B of the center frames 14, and the cylinder portion 32 is supported by rear end portions 15A of the left and right down frames 15.

The cylinder portion 32 can include a cylinder block 32A, a cylinder head 32B, and a cylinder head cover 32C. Specifically, the cylinder block 32A is connected to the front upper portion of the crankcase 31. The cylinder head 32B is connected to an upper portion of the cylinder block 32A. The cylinder head cover 32C covers an upper portion of the cylinder head 32B. In addition, an oil pan 33 is connected to a lower end portion of the crankcase 31. A radiator 41 is disposed forwardly of the cylinder head cover 32C. A side stand 42 can be attached to a lower end portion of the center frame 14 on the left side of the vehicle.

A rotatable driving force outputted from the engine 30 is transmitted to the rear wheel WR via an output shaft 43 provided in a protruding condition on the left side surface of a rear portion of the crankcase 31. drivetrain components such as a drive sprocket 44 mounted on the output shaft 43, a driven sprocket 45 mounted on the left side of the rear wheel WR, and a drive chain 46 trained across the drive sprocket 44 and the driven sprocket 45, act to provide power to rear wheel WR.

Figure 2:
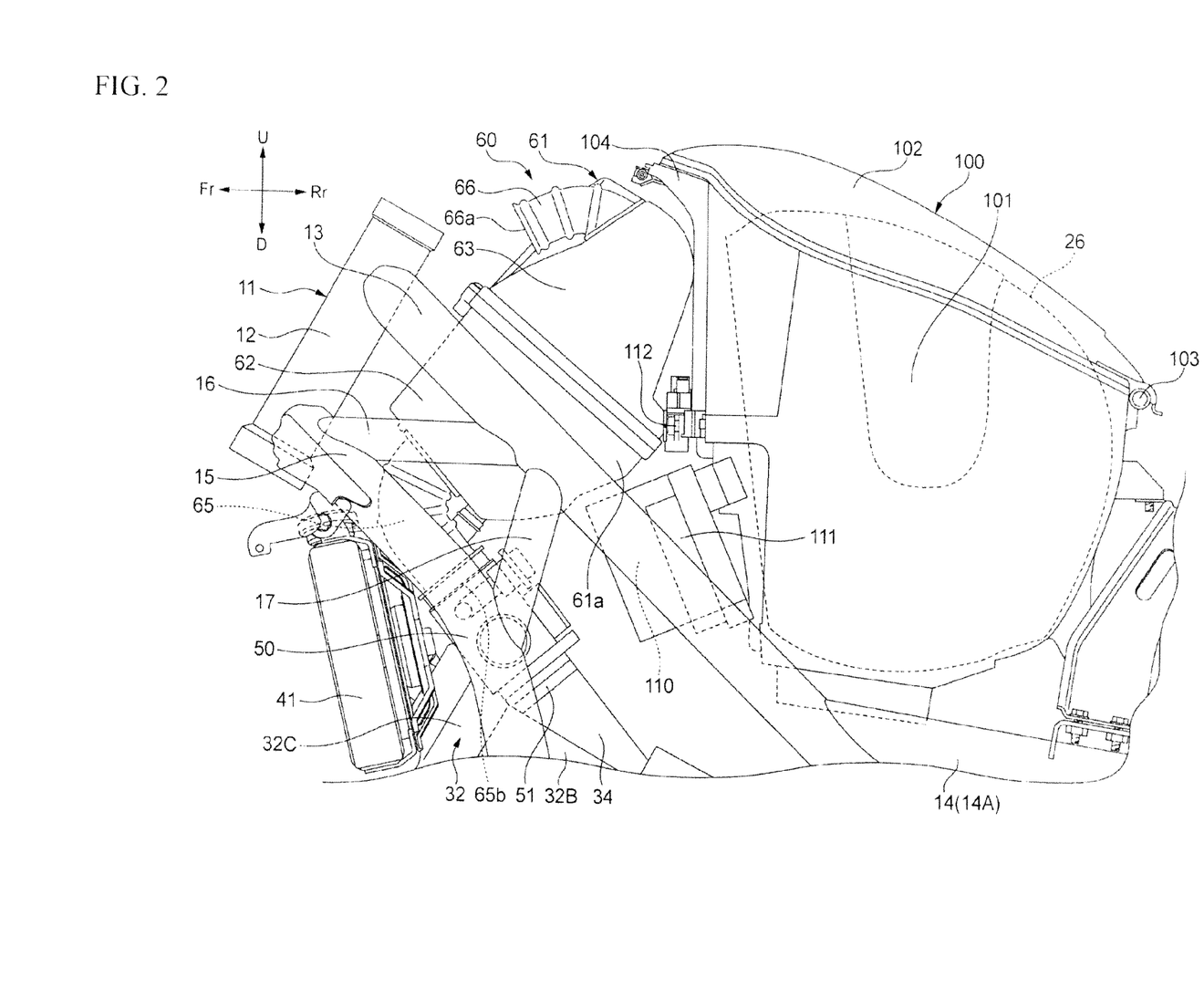
FIG. 2 is a left side elevational view showing the air cleaner device and a storage box shown in FIG. 1.

Referring to FIGS. 1 and 2, a throttle body 50 and an air cleaner device 60 making up an engine air intake system can be connected in sequence to a back surface of the cylinder head 32B. An exhaust pipe 47 and a muffler 48 making up an engine exhaust system are connected in sequence to a front surface of the cylinder head 32B.

The throttle body 50 is mounted via an insulator 51 on an intake manifold portion 34 that is formed on the back surface of the cylinder head 32B. The air cleaner device 60 is connected to an upstream end of the throttle body 50.

Figure 3:
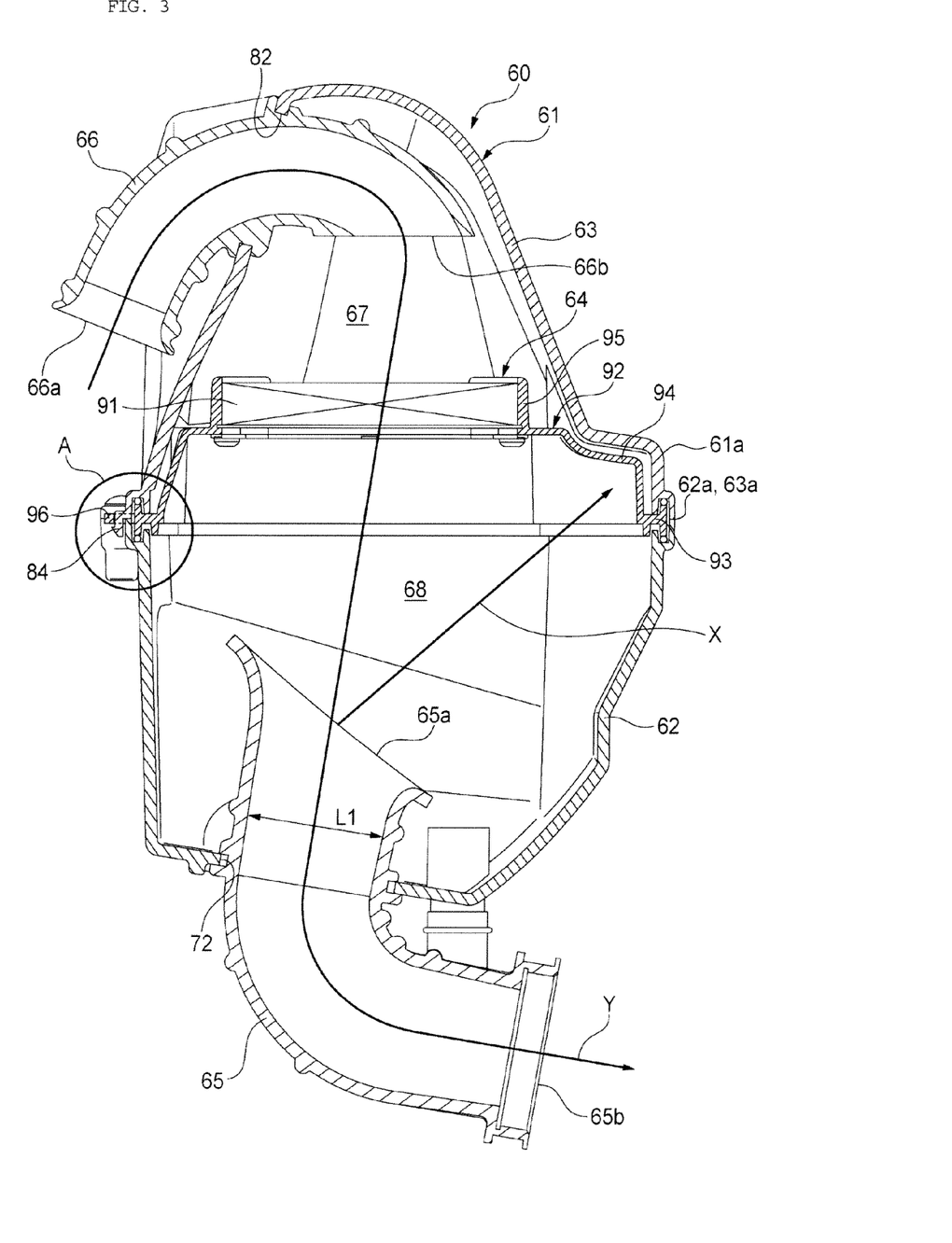
FIG. 3 is a longitudinal cross-sectional view showing the air cleaner device shown in FIG. 2.

Referring to FIGS. 2 and 3, the air cleaner device 60, disposed upwardly of the throttle body 50, can include an air cleaner case 61, an air cleaner element 64, an intake tube or intake path 65, and an intake duct 66. The air cleaner case 61 can include a case main unit 62 and a cover 63, the case main unit 62 forming a lower half and the cover 63 forming an upper half. The air cleaner element 64 is clamped between the case main unit 62 and the cover 63. The air cleaner element 64 removes dust and dirt from an intake air. The intake tube 65 is disposed on a lower surface of the case main unit 62, connecting the upstream end of the throttle body 50 and the air cleaner case 61. The intake duct 66 is disposed on a front surface of the cover 63, guiding the intake air into the air cleaner case 61. The intake air introduced through the intake duct 66 flows past the air cleaner element 64 and is supplied to the engine 30 via the intake tube 65, the throttle body 50, and the insulator 51.

The air cleaner case 61 can be partitioned into upper and lower halves by the air cleaner element 64. An upper space above the air cleaner element 64 forms a dirty room or section 67 to which intake air guided into the intake duct 66 is supplied. A lower space below the air cleaner element 64 forms a clean room or section 68 to which intake air from which dust and dirt are removed is supplied. The air cleaner case 61 is formed to be vertically long in a vehicle side view, in other words, longer in a vertical direction than a horizontal direction.

Figure 4:
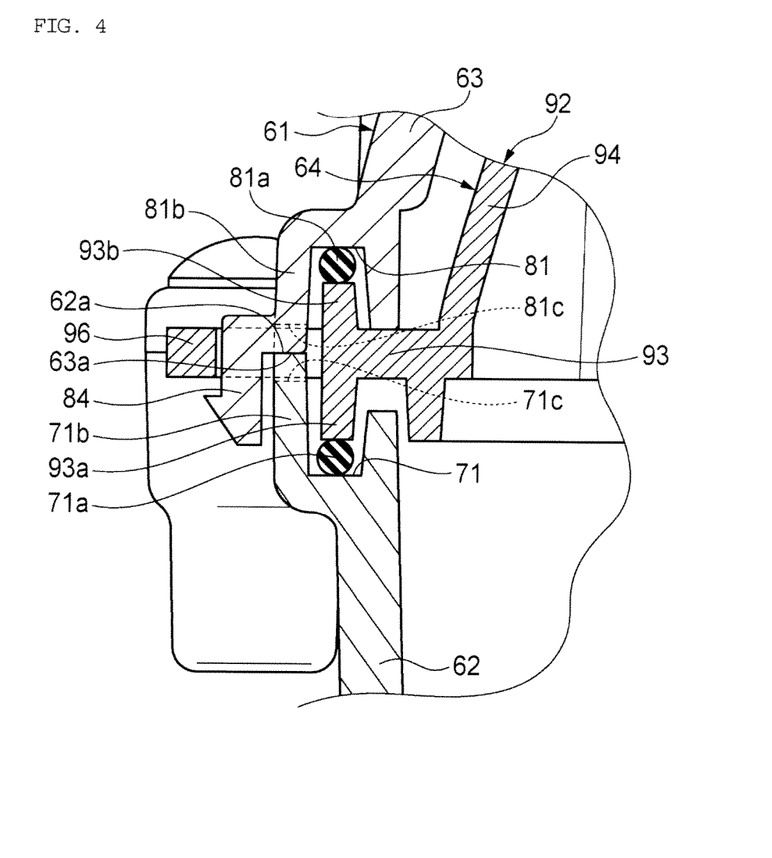
FIG. 4 is an enlarged view showing part A shown in FIG. 3.
Figure 5:
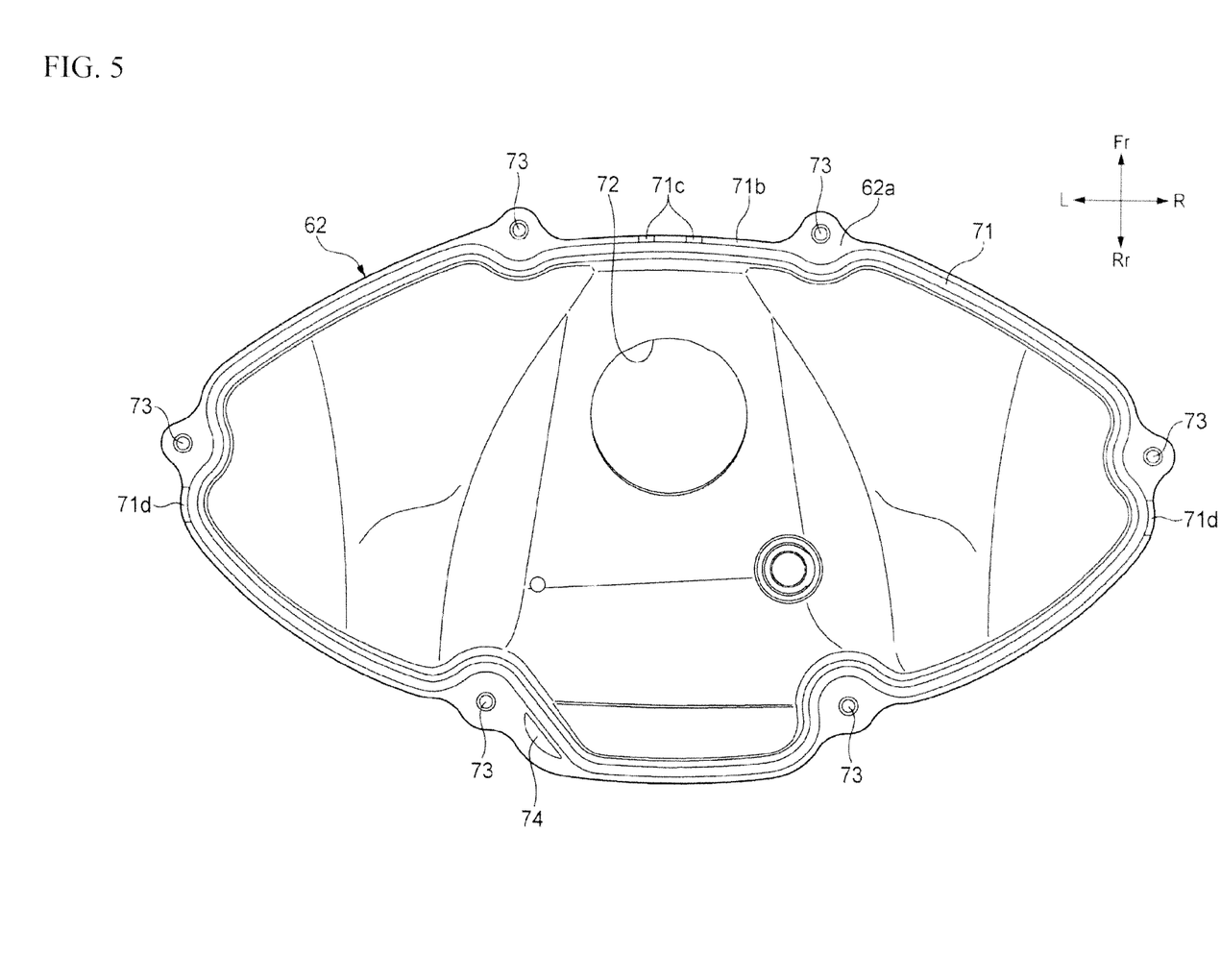
FIG. 5 shows a case main unit shown in FIG. 3, as viewed from above.

Referring to FIGS. 3 to 5, the case main unit 62 has a bottom and is shaped substantially into an ellipse in an upward-looking view. The case main unit 62 includes a fastening surface 62a to be fastened to the cover 63 on a peripheral edge portion thereof. The fastening surface 62a has a peripheral groove 71 in which a lower protruding portion 93a formed along a peripheral edge portion of the air cleaner element 64, to be described later, is fitted. In FIG. 5, reference symbol 72 denotes a tube mounting hole for mounting the intake tube 65 and reference symbol 73 denotes six internally threaded portions into which screws are threaded for fastening the cover 63 to the case main unit 62.

Figure 6:
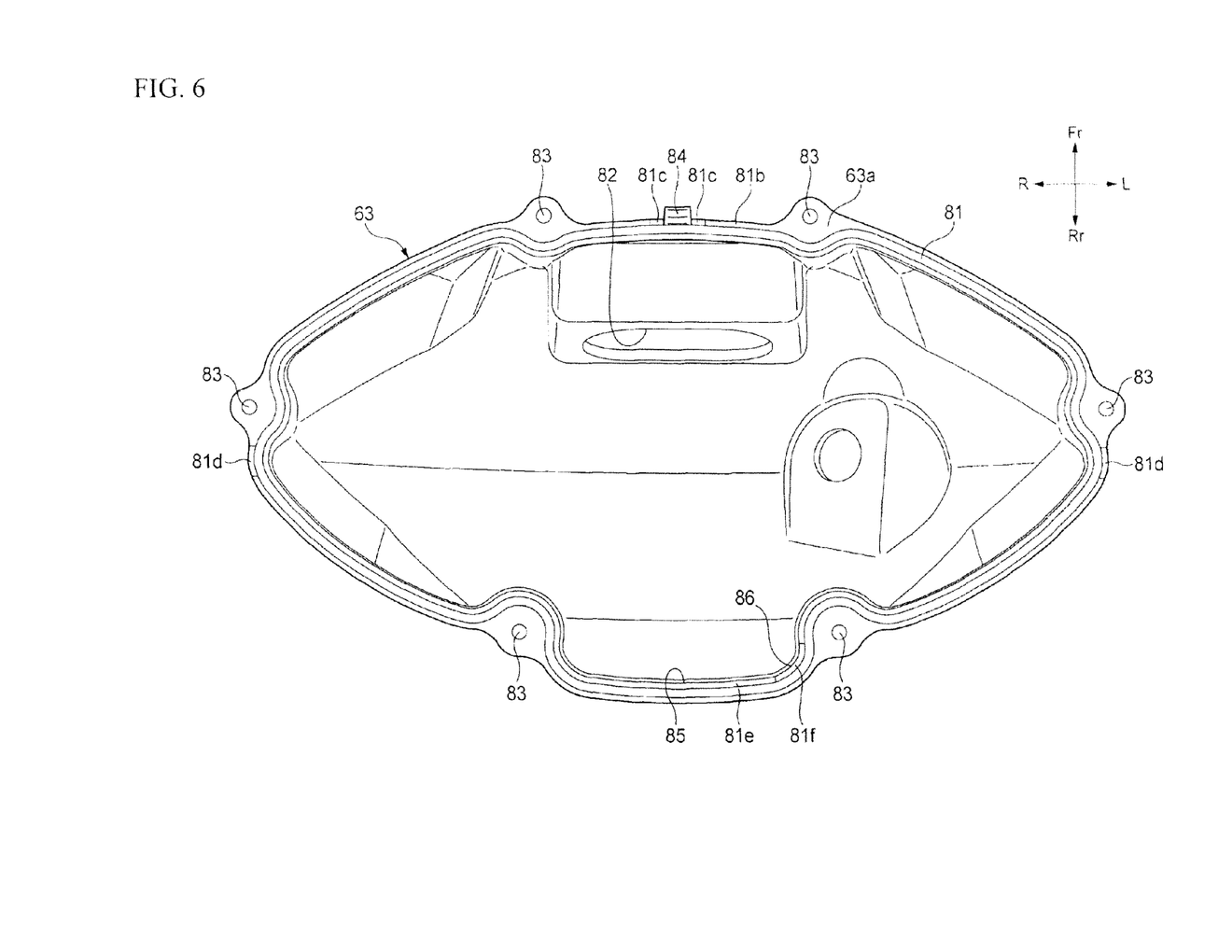
FIG. 6 shows a cover shown in FIG. 3, as viewed from the bottom.

Referring to FIGS. 3, 4, and 6, the cover 63 has a bottom and is shaped substantially into an ellipse in an upward-looking view. The cover 63 includes a fastening surface 63a to be fastened to the case main unit 62 on a peripheral edge portion thereof. The fastening surface 63a has a peripheral groove 81 in which an upper protruding portion 93b formed along a peripheral edge portion of the air cleaner element 64, to be described later, is fitted. In FIG. 6, reference symbol 82 denotes a duct mounting hole for mounting the intake duct 66 and reference symbol 83 denotes six screw threadable portions for passing screws through the six internally threaded portions 73 in the case main unit 62.

Figure 7:
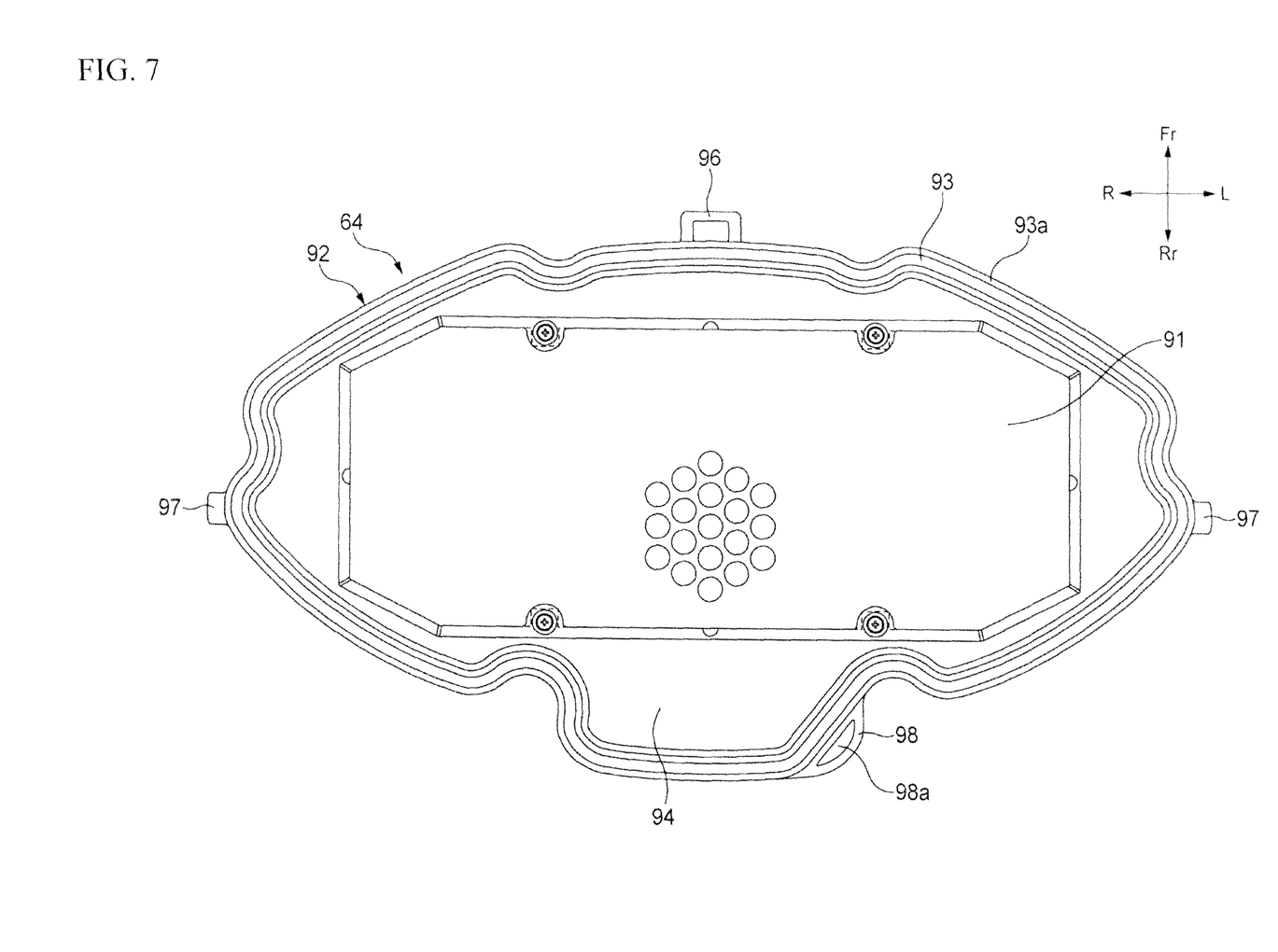
FIG. 7 shows an air cleaner element shown in FIG. 3, as viewed from the bottom.

Referring to FIGS. 3, 4, and 7, the air cleaner element 64 can include a filter portion 91 and a filter supporting unit 92. Specifically, the flat sheet-like filter portion 91 removes dust and dirt from the intake air. The filter supporting unit 92 supports the filter portion 91 in the air cleaner case 61.

The filter supporting unit 92 includes an outer frame portion 93, a tube portion 94, and an inner frame portion 95. Specifically, the outer frame portion 93 is a sheet-like member shaped to be fitted into the peripheral grooves 71, 81 in the case main unit 62 and the cover 63, respectively. The tube portion 94 extends upwardly from an inner peripheral portion of the outer frame portion 93. The inner frame portion 95 extends upwardly from an inner peripheral portion of the tube portion 94. The filter portion 91 is mounted inside the inner frame portion 95.

In addition, the outer frame portion 93 includes the lower protruding portion 93a and the upper protruding portion 93b formed downwardly on a lower surface and upwardly on an upper surface, respectively, along an outer peripheral portion of the outer frame portion 93. Specifically, the lower protruding portion 93a is fitted into the peripheral groove 71 in the case main unit 62, while the upper protruding portion 93b is fitted into the peripheral groove 81 in the cover 63. Additionally, seals 71a, 81a inserted between the lower protruding portion 93a and the upper protruding portion 93b are fitted in bottom portions of the peripheral grooves 71, 81, respectively.

The filter portion 91 is formed substantially into an octagon shape in a plan view such that four corners thereof follow along a peripheral edge portion of the filter supporting unit 92 of the air cleaner element 64.

Referring to FIGS. 4 to 7, the outer frame portion 93 further has an engagement loop 96 formed to face the forward direction of the vehicle at a front central portion on the outer peripheral surface thereof. The cover 63 has an engagement hook 84 formed to face downwardly at a front central portion on the outer peripheral surface thereof near the fastening surface 63a. The engagement hook 84 is to be engaged with the engagement loop 96. Outer wall portions 71b, 81b that form the peripheral grooves 71, 81 of the case main unit 62 and the cover 63, respectively, have fitting recessed portions 71c, 81c that allow the engagement loop 96 to be engaged and fixed without interference each other. The fitting recessed portions 71c, 81c are disposed at positions corresponding to the engagement loop 96.

In addition, the outer frame portion 93 has holding protrusions 97, onto which an operator can hold his or her both hands, each being formed to face the outside in the vehicle width direction at a substantially central position on each side surface of the outer peripheral surface. The outer wall portions 71b, 81b that form the peripheral grooves 71, 81, respectively, have fitting recessed portions 71d, 81d that allow the holding protrusions 97 to be engaged and fixed without interference each other. The fitting recessed portions 71d, 81d are disposed at positions corresponding to the holding protrusions 97.

In the air cleaner device 60 according to the embodiment of the present invention, the cover 63 and the air cleaner element 64 are integrally held at three places when the engagement hook 84 is engaged with the engagement loop 96 and the operator holds onto the holding portions 97 with his or her both hands. This allows the cover 63 and the air cleaner element 64 to be integrally removed or reinstalled relative to the case main unit 62. More specifically, with the cover 63 and the air cleaner element 64 integrally held in position, the cover 63 and the air cleaner element 64 are raised such that the lower protruding portion 93a of the air cleaner element 64 is disengaged from the peripheral groove 71 in the case main unit 62 and are slidingly moved in the vehicle width direction.

Referring to FIGS. 5 to 7, the cover 63 includes a recessed portion 85 formed at a rear portion thereof between the screw threadable portions 83. The recessed portion 85 includes a drain portion 86 for discharging drain, disposed on an inner surface at the left corner thereof. Additionally, the outer frame portion 93 of the air cleaner element 64 includes a protruding tab 98 formed on an outer peripheral surface thereof at a position corresponding to the drain portion 86. The protruding tab 98 has a drain hole 98a that communicates with the drain portion 86. In addition, the fastening surface 62a of the case main unit 62 has a drain hole 74 at a position corresponding to the drain portion 86. The drain hole 74 communicates with the drain portion 86 and the drain hole 98a. Further, an inner wall portion 81e that forms the peripheral groove 81 of the cover 63 has a recessed portion 81f disposed at a position corresponding to the protruding tab 98, in which the protruding tab 98 is to be fitted.

Referring to FIG. 3, the intake duct 66 is curved so as to have an upstream-side opening portion 66a oriented toward the front side of the air cleaner case 61 and a downstream-side opening portion 66b oriented downwardly.

The downstream-side opening portion 66b of the intake duct 66 is formed to be in parallel with an upper surface of the filter portion 91 of the air cleaner element 64.

Referring to FIG. 3, the intake tube 65 is curved so as to have an upstream-side opening portion 65a oriented upwardly to face the downstream-side opening portion 66b of the intake duct 66 and a downstream-side opening portion 65b oriented rearwardly of the air cleaner case 61.

The downstream-side opening portion 66b of the intake duct 66 and the upstream-side opening portion 65a of the intake tube 65 are disposed to face each other. In addition, the intake duct 66 and the intake tube 65 are disposed such that a rear portion of the intake duct 66 overlaps a front portion of the intake tube 65 in projection (in the vertical direction).

Additionally, referring to FIG. 3, the air cleaner case 61 can have a bulge 61a formed at a substantially central portion in a vertical direction on a rear portion thereof. The bulge 61a bulges more as compared with a front portion of the air cleaner case 61. The upstream-side opening portion 65a of the intake tube 65 is formed obliquely so as to be oriented toward an inner surface of the bulge 61a (see an arrow X in FIG. 3). Further, the upstream-side opening portion 65a of the intake tube 65 is formed obliquely, in a vehicle side view, relative to a path width L1 of the intake tube 65. The downstream-side opening portion 65b of the intake tube 65 is faced toward the rear of the vehicle and connected to the throttle body 50.

Additionally, the air cleaner case 61 is disposed in an inclined position in a vehicle side view such that the rear portion thereof is disposed downwardly of the front portion thereof, so that the air cleaner case 61 is disposed to extend substantially along a longitudinal direction of the head pipe 12.

Referring to FIG. 2, a storage box 100 is disposed rearwardly of the air cleaner case 61 and upwardly of the pair of left and right center frames 14. The storage box 100 includes a box main unit 101 and a lid portion 102. Specifically, the box-like box main unit 101 is fixed to the pair of left and right center frames 14. The lid portion 102 opens or closes the box main unit 101. The lid portion 102 is to be swung open or closed about a hinge 103 disposed at an upper end of a rear portion of the box main unit 101. The storage box 100 has a capacity of being able to store a full face helmet 26.

Additionally, the air cleaner case 61 is disposed in a position inclined relative to a front surface of the storage box 100 in a vehicle side view. A battery 110, a fuse box 111, and an inclination sensor 112 as electrical components can be disposed between a rear surface of the air cleaner case 61 and the front surface of the storage box 100.

As described above, in the air cleaner device 60 according to an embodiment of the present invention, when the air cleaner device 60 is mounted in a vehicle and viewed from a vehicle side, the air cleaner case 61 is formed to be longer in a vertical direction than a horizontal direction. The intake duct 66 is formed to have the upstream-side opening portion 66a thereof oriented toward a front side of the air cleaner case 61 and the downstream-side opening portion 66b thereof oriented downwardly. The intake tube 65 is formed to have the upstream-side opening portion 65a thereof oriented upwardly to face the downstream-side opening portion 66b of the intake duct 66 and the downstream-side opening portion 65b thereof oriented toward a rear side of the air cleaner case 61. An intake air can therefore be smoothly introduced to form a substantially S-shaped stream (see arrow Y in FIG. 3) to thereby achieve a good intake air stream for the air cleaner device 60. In addition, as compared with the related art arrangement in which the downstream-side opening portion of the intake duct and the upstream-side opening portion of the intake tube are oriented toward the same direction, the air cleaner device 60 can be made smaller in longitudinal and vertical lengths. The air cleaner device 60 can therefore be built compactly.

In the air cleaner device 60 according to an embodiment of the present invention, the downstream-side opening portion 66b of the intake duct 66 and the upstream-side opening portion 65a of the intake tube 65 are disposed to face each other. This ensures a good intake air stream. In addition, the intake duct 66 and the intake tube 65 are disposed such that at least parts thereof overlap each other in projection. The air cleaner device 60 can have a shorter longitudinal length and can thus be built compactly.

In the air cleaner device 60 according to an embodiment of the present invention, when the air cleaner device 60 is mounted in a vehicle and viewed from a vehicle side, the upstream-side opening portion 65a of the intake tube 65 is obliquely formed relative to the path width L1 of the intake tube 65. As compared with an arrangement in which the upstream-side opening portion 65a of the intake tube 65 is formed to have the same path width L1 as that of the intake tube 65, a larger amount of intake air can be drawn in more smoothly.

In the air cleaner device 60 according to an embodiment of the present invention, the bulge 61a that bulges more as compared with the front portion of the air cleaner case 61 is formed on the rear portion of the air cleaner case 61 and the upstream-side opening portion 65a of the intake tube 65 is formed so as to be oriented toward the inner surface of the bulge 61*a*. This arrangement enhances intake efficiency, as compared with an arrangement in which the upstream-side opening portion 65*a* of the intake tube 65 is oriented toward the front portion of the air cleaner case 61.

In the air cleaner device 60 according to an embodiment of the present invention, the downstream-side opening portion 66*b* of the intake duct 66 is formed to be in parallel with an upper plane of the flat sheet-like filter portion 91 of the air cleaner element 64. The intake air introduced through the intake duct 66 can therefore be made to flow linearly and evenly relative to the filter portion 91, so that filtration efficiency can be enhanced.

In the air cleaner device 60 according to an embodiment of the present invention, the air cleaner case 61 is disposed so as to extend along the longitudinal direction of the head pipe 12. A distance between the head pipe 12 and the air cleaner device 60 can therefore be made small. Additionally, the intake tube 65 is faced rearwardly of the vehicle and connected to the engine 30. As compared with an arrangement in which the air cleaner device 60 is disposed to extend longitudinally in a perpendicular direction, the engine 30 can be faced forwardly of the vehicle to be compactly disposed, which makes for a shorter longitudinal length of the vehicle 10.

In the air cleaner device 60 according to an embodiment of the present invention, the air cleaner case 61 is disposed forwardly of the storage box 100. The air cleaner case 61 is disposed obliquely relative to the front surface of the storage box 100, and electrical components, namely the battery 110, the fuse box 111, and the inclination sensor 112 can be disposed between the rear portion of the air cleaner case 61 and the front portion of the storage box 100. The battery 110, the fuse box 111, and the inclination sensor 112 can therefore be disposed by effectively using a dead space between the air cleaner case 61 and the storage box 100.

In the air cleaner device 60 according to an embodiment of the present invention, the filter portion 91 can be formed such that the four corners thereof follow along the peripheral edge portion of the air cleaner element 64. As compared with an arrangement in which the filter portion 91 is formed into a simple rectangle, the filter portion 91 can have a greater filtering area for the improved filtration efficiency.

DESCRIPTION OF REFERENCE SYMBOLS

10: Motorcycle
11: Vehicle body frame
12: Head pipe
30: Engine
60: Air cleaner device
61: Air cleaner case
61*a*: Bulge
62: Case main unit
63: Cover
64: Air cleaner element
91: Filter portion
65: Intake tube (intake path)
L1: Path width
65*a*: Upstream-side opening portion
65*b*: Downstream-side opening portion
66: Intake duct
66*a*: Upstream-side opening portion
66*b*: Downstream-side opening portion
100: Storage box
110: Battery (electrical component)
111: Fuse box (electrical component)
112: Inclination sensor (electrical component)

We claim:

1. An air cleaner device, comprising:
an air cleaner case including a case main unit and a cover;
an intake duct disposed on the cover;
an intake path disposed on the case main unit and configured to be connected to an engine; and
an air cleaner element accommodated in the air cleaner case, and configured such that an intake air introduced through the intake duct flows past the air cleaner element before being supplied to the engine by way of the intake path,
wherein the air cleaner device is configured to be mounted in a vehicle such that, when viewed from a vehicle side, the air cleaner case is longer in a vertical direction than a horizontal direction,
wherein the intake duct is configured to have an upstream-side opening portion thereof oriented toward a first side of the air cleaner case and a downstream-side opening portion thereof oriented downwardly; and
wherein the intake path includes an upstream-side opening portion thereof oriented upwardly to face the downstream-side opening portion of the intake duct and a downstream-side opening portion thereof oriented toward a second side of the air cleaner case.

2. The air cleaner device according to claim 1, wherein the downstream-side opening portion of the intake duct and the upstream-side opening portion of the intake path are disposed to face each other; and
wherein the intake duct and the intake path are disposed such that at least parts thereof overlap each other in projection.

3. The air cleaner device according to claim 1, wherein the air cleaner device is configured to be mounted in a vehicle such that when viewed from a vehicle side, the upstream-side opening portion of the intake path is obliquely formed relative to a path width of the intake path.

4. The air cleaner device according to claim 1, wherein the second side of the air cleaner case includes a bulge as compared with the first side thereof; and
the upstream-side opening portion of the intake path is configured to be oriented toward an inner surface of the bulge.

5. The air cleaner device according to claim 1, wherein the downstream-side opening portion of the intake duct is configured to be in parallel with a plane of a flat sheet-like filter portion of the air cleaner element.

6. The air cleaner device according to claim 1, wherein the air cleaner device is configured to be mounted on a vehicle body frame of a vehicle which includes a head pipe disposed at a front end thereof,
wherein the air cleaner case is disposed to extend along a longitudinal direction of the head pipe, and
wherein the intake path is faced rearwardly of the vehicle and connected to the engine.

7. The air cleaner device according to claim 1, wherein the air cleaner case is configured to be disposed forwardly of a storage box mounted on a vehicle,
wherein the air cleaner case is configured to be disposed obliquely relative to a front surface of the storage box, and
wherein the air cleaner case is configured such that electrical components can be disposed between a rear portion of the air cleaner case and a front portion of the storage box.

8. The air cleaner device according to claim 5, wherein the filter portion is configured such that four corners thereof follow along a peripheral edge portion of the air cleaner element.

9. A vehicle, comprising:
a frame;
an engine mounted on said frame;
an air cleaner device in communication with said engine, said air cleaner device comprising an air cleaner case including a case main unit and a cover, and an intake duct disposed on the cover,
wherein an intake path is disposed on the case main unit and connected to the engine, wherein an air cleaner element is accommodated in the air cleaner case and configured such that intake air introduced through the intake duct flows path the air cleaner element before being supplied to the engine by way of the intake path, wherein the air cleaner case is formed to the longer and a vertical direction than a horizontal direction as disposed on the vehicle and as viewed from a side of the vehicle, wherein the intake duct is configured to have an upstream side open portion thereof oriented toward a first side of the air cleaner case, and a downstream-side opening portion thereof oriented downwardly, and wherein the intake path is formed to have an upstream side opening portion thereof oriented upwardly to face the downstream side opening portion of the intake duct and a downstream-side opening portion thereof oriented toward a second side of the air cleaner case.

10. A vehicle according to claim 9, wherein
the downstream-side opening portion of the intake duct and the upstream-side opening portion of the intake path are disposed to face each other, and
wherein the intake duct and the intake path are disposed such that at least parts thereof overlap each other in projection.

11. A vehicle according to claim 9, wherein the upstream-side opening portion of the intake path is obliquely formed relative to a path width of the intake path.

12. A vehicle according to claim 9, wherein a second side of the air cleaner case includes a bulge as compared with the first side thereof, and wherein the upstream-side opening portion of the intake path is configured to be oriented toward an inner surface of the bulge.

13. A vehicle according to claim 9, wherein a downstream-side opening portion of the intake duct is configured to be in parallel with a plane of a flat sheet-like circular portion of the air cleaner element.

14. A vehicle according to claim 9, further comprising:
a head pipe disposed at a front end of the frame,
wherein the air cleaner case is disposed so as to extend in a longitudinal direction of the head pipe, and wherein the intake path is faced rearwardly of the vehicle and is connected to the engine.

15. A vehicle according to claim 9, further comprising:
a storage box disposed on the frame, wherein the air cleaner case is disposed forwardly of the storage box, and obliquely relative to a front surface thereof, and wherein electrical components are disposed between a rear portion of the air cleaner case and a front portion of the storage box.

16. A vehicle according to claim 13, wherein the filter portion is configured such that four corners thereof follow along a peripheral edge portion of the air cleaner element.

17. An air cleaner device, comprising:
case means for housing air cleaner components therein, said case means including main unit means, and a cover means;
intake duct means disposed on the cover means;
intake path means disposed on the main unit means, for connecting the air cleaner case to an engine; and
element means accommodated in the case means, said element means for filtering intake air introduced through the intake duct means before being supplied to the engine via the intake path means,
wherein the air cleaner device is configured to be mounted in a vehicle such that, when viewed from a vehicle side, the case means is longer in a vertical direction than a horizontal direction, wherein the intake duct means includes an upstream-side opening portion thereof oriented toward a first side of the air cleaner case and a downstream-side opening portion thereof oriented downwardly, and wherein the intake path means includes an upstream-side opening portion thereof oriented upwardly to face the downstream-side opening portion of the intake duct means and a downstream-side opening portion thereof oriented toward a second side of the air cleaner case.

* * * * *